(12) United States Patent
Lee

(10) Patent No.: US 12,014,244 B2
(45) Date of Patent: Jun. 18, 2024

(54) SYSTEM AND METHOD FOR MONITORING OBJECT RECOGNITION BASED ON ARTIFICIAL INTELLIGENCE USING INTERNET OF THING SENSORS

(71) Applicant: 4STEC Inc., Incheon (KR)

(72) Inventor: Seung Won Lee, Incheon (KR)

(73) Assignee: 4STEC Inc., Incheon (KR)

( * ) Notice: Subject to any disclaimer, the term of this patent is extended or adjusted under 35 U.S.C. 154(b) by 78 days.

(21) Appl. No.: 18/064,879

(22) Filed: Dec. 12, 2022

(65) Prior Publication Data
US 2024/0169168 A1   May 23, 2024

(30) Foreign Application Priority Data
Nov. 17, 2022   (KR) .................. 10-2022-0154294

(51) Int. Cl.
*G06K 7/10* (2006.01)
*G06N 3/0442* (2023.01)
*G16Y 40/10* (2020.01)

(52) U.S. Cl.
CPC ........ *G06K 7/10366* (2013.01); *G06N 3/0442* (2023.01); *G16Y 40/10* (2020.01)

(58) Field of Classification Search
None
See application file for complete search history.

(56) References Cited

U.S. PATENT DOCUMENTS

| | | | |
|---|---|---|---|
| 11,000,613 B1 * | 5/2021 | Kellogg, Jr. | F24F 11/75 |
| 11,224,673 B1 * | 1/2022 | Kellogg, Jr. | F24F 11/75 |
| 2021/0157312 A1 * | 5/2021 | Cella | G01M 13/045 |
| 2021/0226812 A1 * | 7/2021 | Park | G06F 16/9024 |
| 2021/0258712 A1 * | 8/2021 | Lyren | H04R 5/033 |
| 2022/0187847 A1 * | 6/2022 | Cella | G05B 19/41885 |
| 2023/0176557 A1 * | 6/2023 | Cella | G05B 23/0283 |
| | | | 700/117 |

FOREIGN PATENT DOCUMENTS

| | | | |
|---|---|---|---|
| CN | 106204187 A | * | 12/2016 |
| CN | 113651059 A | * | 11/2021 |

* cited by examiner

*Primary Examiner* — Fekadeselassie Girma
(74) *Attorney, Agent, or Firm* — BROADVIEW IP LAW, PC (57) ABSTRACT

Provided is an artificial intelligence-based object identification and monitoring system using IoT sensors, the system including: an IoT sensing device configured to acquire sensor data and IR image data of a target space or a target object by using a plurality of the sensors; integrated IOT middleware; an IoT control server configured to use the integrated IoT middleware to process the data acquired by the IOT sensing device, and perform an AI analysis of the processed data; and an IoT monitoring server configured to monitor the IoT sensing device according to a result of the AI analysis, and perform control such that an external electronic device outputs a result of monitoring. Various other embodiments may be possible.

14 Claims, 6 Drawing Sheets

SYSTEM AND METHOD FOR MONITORING OBJECT RECOGNITION BASED ON ARTIFICIAL INTELLIGENCE USING INTERNET OF THING SENSORS

CROSS REFERENCE TO RELATED APPLICATION

The present application claims priority to Korean Patent Application No. 10-2022-0154294, filed on Nov. 17, 2022, the entire contents of which are incorporated herein for all purposes by this reference.

BACKGROUND OF THE INVENTION

Field of the Invention

The present disclosure relates to an artificial intelligence (AI)-based object identification and monitoring system using IoT sensors, and an object identification and monitoring method of the system.

Description of the Related Art

In general, in identifying objects in industrial sites, a barcode or a radio-frequency identification (RFID) tag attached to each object is read to determine information on the object. In the meantime, a barcode/tag reading method has a problem that it is difficult to read barcodes of several objects simultaneously, and an RFID tag reading method has a problem that it is difficult to determine types of the objects.

In addition, infrared (IR) sensors may be used to measure temperatures of the objects and determine the types of the objects corresponding to the measured temperature values. In the meantime, the method of identifying an object using an IR sensor may have inconvenience that a measured temperature value and the object need to be matched in advance for association therebetween.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure is intended to identify objects accurately by using IoT data including RFID tag and IR image data.

In addition, the present disclosure is intended to monitor a state of a current object by using IoT data, predict risks, and is directed to providing an interface that enables a manager to monitor, predict, and manage IoT data.

According to an embodiment of the present disclosure, there is provided an artificial intelligence-based object identification and monitoring system using IoT sensors, the system including: an IoT sensing device configured to acquire sensor data and IR image data of a target space or a target object by using a plurality of the sensors; integrated IOT middleware; an IoT control server configured to use the integrated IoT middleware to process the data acquired by the IoT sensing device, and perform an AI analysis of the processed data; and an IoT monitoring server configured to monitor the IOT sensing device according to a result of the AI analysis, and perform control such that an external electronic device outputs a result of monitoring.

According to an embodiment of the present disclosure, there is provided an artificial intelligence-based object identification and monitoring method using IoT sensors, the method including: acquiring sensor data and IR image data of a target space or a target object by using a plurality of the sensors included in an IOT sensing device; using, by an IoT control server, integrated IoT middleware including RFID middleware and IOT device software to process the data acquired by the IoT sensing device, and performing an AI analysis of the processed data; and monitoring, by an IoT monitoring server, the IoT sensing device according to a result of the AI analysis, and performing control such that an external electronic device outputs a result of monitoring.

The artificial intelligence-based object identification and monitoring system using IOT sensors according to the present disclosure integrates an RFID tag, IoT sensor data, and IR image data into IoT data, performs an AI analysis of the IoT data, and monitors a state of an object in a current particular space, thereby managing the IoT sensing device efficiently.

Effects of the present disclosure are not limited thereto, and various effects will be described in detail below with reference to each embodiment.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The present disclosure may be modified in various ways and implemented by various embodiments, so that specific embodiments are shown in the drawings and will be described in detail. However, it is to be understood that the present disclosure is not limited to the specific exemplary embodiments, but includes all modifications, equivalents, and substitutions included in the spirit and the scope of the present disclosure.

Terms used in the specification, "first", "second", "A", "B", etc. can be used to describe various elements, but the elements are not to be construed as being limited to the terms. These terms are only used to distinguish one element from another. For example, the "first" element may be named the "second" element without departing from the scope of the present disclosure, and the "second" element may also be similarly named the "first" element. The term "and/or" includes a combination of a plurality of items or any one of a plurality of terms. For example, "A and/or B" may be interpreted as meaning "either A or B or both". In addition, "/" may be interpreted as "and" or "or".

As used herein, the singular forms "a," "an" and "the" are intended to include the plural forms as well, unless the context clearly indicates otherwise. It is to be understood that the terms "comprise", or the like specify the presence of stated features, numbers, steps, operations, elements, components or combinations thereof, but do not preclude the presence or addition of one or more other features, numbers, steps, operations, elements, components, or combinations thereof.

Prior to a detailed description of the drawings, it is to be clarified that components are just classified for each main function which each component takes charge of. That is, two or more components to be described below may be provided to be combined into one component or one component may be provided to be separated into two or more for each of more subdivided functions. In addition, each of the components to be described below may additionally perform some or all of functions which other components take charge of in addition to the main function which each component takes charge of, and some of the main functions which each component takes charge of may be exclusively performed by other components.

In addition, in carrying out a method or an operation method, the steps of the method may occur in an order different from an order described herein unless a specific order is clearly stated in context. In other words, the steps of the method may be performed in the same order as described, may be performed at substantially the same time, or may be performed in reverse order.

Figure 1:
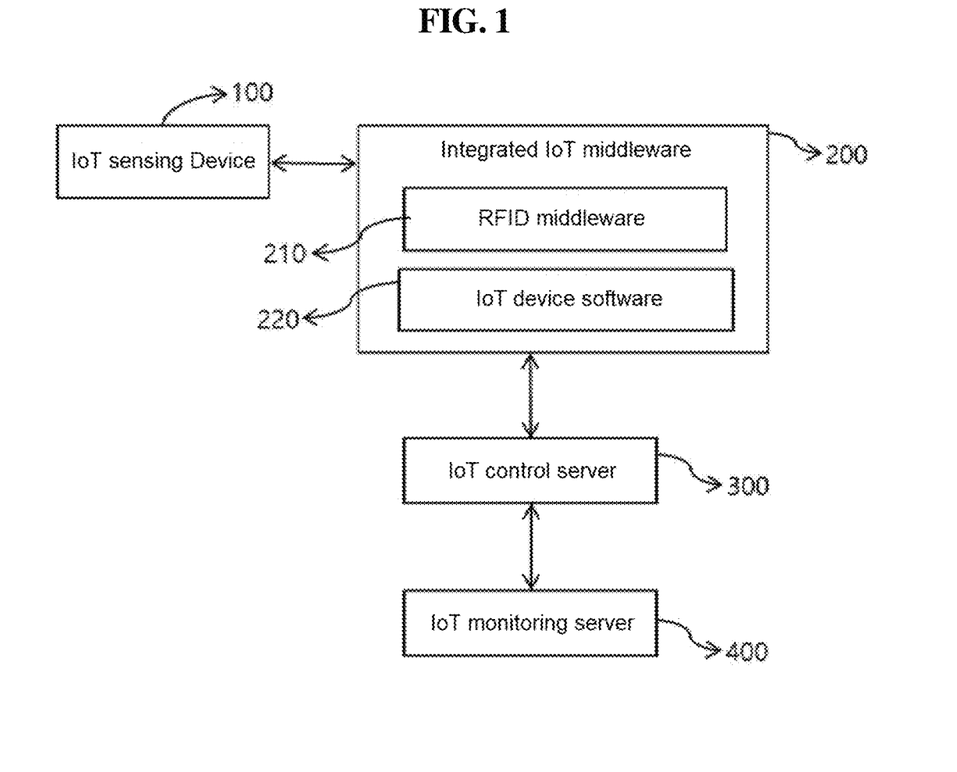
FIG. 1 is a diagram illustrating a configuration of an AI-based object identification and monitoring system using IoT sensors according to an embodiment of the present disclosure.

FIG. 1 is a diagram illustrating a configuration of an AI-based object identification and monitoring system using IoT sensors according to an embodiment of the present disclosure.

Referring to FIG. 1, the object identification and monitoring system may include an IoT sensing device 100, integrated IoT middleware 200, an IoT control server 300, and an IoT monitoring server 400.

According to an embodiment of the present disclosure, the IoT sensing device 100 may include a plurality of IoT sensors or devices and may acquire barcodes, RFID tags, IoT sensor data, or IR image data from the plurality of IoT sensors or devices.

According to an embodiment of the present disclosure, the integrated IoT middleware 200 may include RFID middleware 210 and IoT device software (SW) 220. It is to be understood that other elements for processing various types of data received from the IoT sensing device 100 may be further included.

According to an embodiment of the present disclosure, the RFID middleware 210 may store therein programs for client security management, basic filtering, an application level events (ALE) service engine, leader proxy, security encoding/decoding, and log management and system monitoring.

According to an embodiment of the present disclosure, the IoT control server 300 may use the ALE service engine to set at least one device of the IoT sensing device 100 as a logic IoT device group, and may receive sensor data or tag information from IoT devices belonging to the set group. For example, the IoT control server 300 may process received data into data executable in an application that the IoT monitoring server 400 provides.

According to an embodiment of the present disclosure, the IoT device SW 220 may store therein programs for performing monitoring of the IOT sensing device 100, proxy, security management, link management, connection management, database (DB) management, and event monitoring.

According to an embodiment of the present disclosure, the integrated IoT middleware 200 may integrate data processed by the RFID middleware 210 and data processed by the IoT device SW 220 into IoT data and may store the IoT data. For example, the integrated IOT middleware 200 may divide the data of the RFID middleware 210 and the data of the IoT device SW 220 each in a hierarchical structure, and may gradually integrate the data in a direction from the top to the bottom.

According to an embodiment of the present disclosure, the integrated IoT middleware 200 may transmit integrated IoT data to the IoT control server 300. For example, as a request for processing or interpreting data is received from the IoT control server 300, the integrated IoT middleware 200 may process the data through the RFID middleware 210 when the data is RFID data, or may process the data through the IoT device SW 220 when the data is IoT sensor data. Herein, data processing may include a process of converting or processing IoT data into data interpretable by the IoT control server 300. Afterward, the integrated IoT middleware 200 may transmit a processing result to the IoT control server 300.

According to an embodiment of the present disclosure, for data processing, the integrated IoT middleware 200 may perform a process of converting or processing IoT data into data interpretable by the IoT control server 300. In addition, the integrated IoT middleware 200 may establish a connection between RFID data and IoT sensor data of IoT data for each data layer or various channels.

According to an embodiment of the present disclosure, in order to interpret IoT sensor data, the integrated IOT middleware 200 may use RFID data connected with the IoT sensor data. Conversely, in order to interpret RFID data, the integrated IoT middleware 200 may use IoT sensor data corresponding to the same layer as the RFID data or connected with the RFID data.

According to an embodiment of the present disclosure, the IoT control server 300 may determine basic information on a particular object according to IoT data transmitted from the IoT sensing device 100. For example, when the IoT control server 300 receives a barcode or an RFID tag of IoT data, the IoT control server 300 may discover information corresponding to the received barcode or tag from pre-stored information and may determine basic information (e.g., the manufacturer and the type) on an item.

According to an embodiment of the present disclosure, when the IoT control server 300 receives IR image data of IoT data, the IoT control server 300 may perform an AI analysis of temperature distribution included in the IR image data to determine appearance information on an object. For example, the appearance information may include a loading state, a location, a movement state of the object, or the number of objects in a particular space.

According to an embodiment of the present disclosure, the IoT control server 300 may control the overall operation of the object identification and monitoring system. For example, the IoT control server 300 may use the integrated IoT middleware 200 to process IoT sensor data or IR image data acquired through the IoT sensing device 100, may perform an AI analysis of the processed data to identify an object, and may provide monitoring information related to the object. Afterward, the IoT control server 300 may perform control through the IoT monitoring server 400 such that various electronic devices output the monitoring information.

According to an embodiment of the present disclosure, the IoT control server 300 may receive IoT data including IR image data and RFID tag from the IoT sensing device 100 through various communication methods (e.g., Wi-Fi, LTE, NB-IOT, LoRa, and 5G), and may transmit a result of monitoring the IoT data to the IoT monitoring server 400.

According to an embodiment of the present disclosure, the IoT control server 300 may receive weather information, earthquake measurement information, and facility (or space) information from external servers through various communication methods, and may store the received information in a designated electronic device. In addition, the IoT control server 300 may apply a predetermined collection policy to received information or may convert data in a predetermined manner so as to improve security.

According to an embodiment of the present disclosure, the IoT monitoring server 400 may perform control such that various electronic devices output monitoring information. For example, the IOT monitoring server 400 may perform monitoring based on IoT data resulting from conversion or processing by the IoT control server 300.

According to an embodiment of the present disclosure, the IoT monitoring server 400 may provide a result of monitoring for each individual piece of sensor data and for each IoT sensing device 100, and may build an application user interface (UI) for displaying the result of monitoring. For example, the UI may display a table or a graph for a data analysis, or may display setting information on each IoT sensing device 100 in a particular space and detailed/setting information on the space.

According to an embodiment of the present disclosure, the IoT monitoring server 400 may provide a function of a service, terminal registration/management, system management, or management of connection with external systems through the application UI. For example, the IoT monitoring server 400 may provide the application UI to an electronic device of a related user.

According to an embodiment of the present disclosure, as a user accesses an account, the IoT monitoring server 400 may transmit IoT data about the user's objects (e.g., PLCs, agricultural and marine products, and displayed goods) and places (e.g., manufacturing/construction sites, convenience stores, warehouse store, department stores, unmanned stores) related to distribution/logistics as application UI information.

According to an embodiment of the present disclosure, application UI information may include state information on an object related to a particular place. For example, regarding a manufacturing/construction site (or smart factory), various types of information that may be generated at the manufacturing/construction site may be included, for example, employee safety/access management, records management, production process management, item management, materials management, warehouse management, an industrial vehicle/conveyor belt operation state, etc.

According to an embodiment of the present disclosure, application UI information may include information on origins and history states regarding agricultural and marine products distribution through smart farms.

Figure 2:
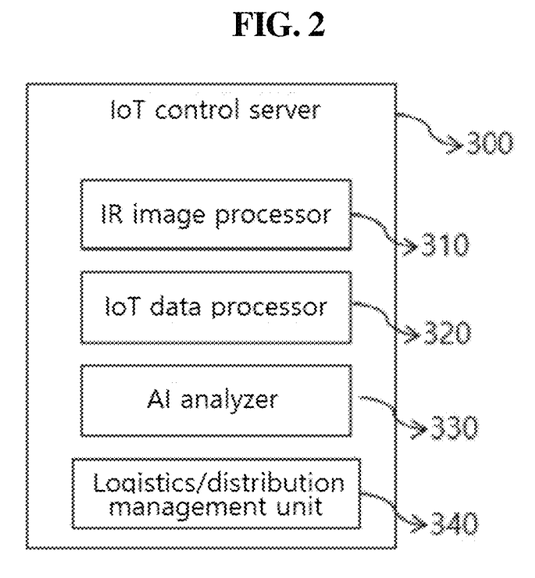
FIG. 2 is a block diagram illustrating a configuration of an IoT control server 300 according to an embodiment of the present disclosure.

FIG. 2 is a block diagram illustrating a configuration of an IoT control server 300 according to an embodiment of the present disclosure.

Referring to FIG. 2, the IoT control server 300 may include an infrared (IR) image processor 310, an IoT data processor 320, an AI analyzer 330, and a logistics/distribution management unit 340.

According to an embodiment of the present disclosure, the IR image processor 310 may process data of an IR sensor included in an IoT sensing device 100. For example, the IR sensor may detect infrared energy, and may output the detected infrared as image data according to the temperature of the energy.

According to an embodiment of the present disclosure, the IoT data processor 320 may receive IoT sensor data from an RFID gate 104 (or speed gate) included in the IoT sensing device 100, and may determine information included in the sensor data.

According to an embodiment of the present disclosure, the AI analyzer 330 may perform an AI analysis of IR image data and IoT data, and may identify object information according to a result of the AI analysis. For example, the AI analyzer 330 may apply IR image data to an AI analysis model to derive an object identification index and measure or predict a target object.

According to an embodiment of the present disclosure, the AI analyzer 330 may detect changes or dynamic values (e.g., temperature time series) in parameter distribution of IOT data received from the IoT sensing device 100. For example, the AI analyzer 330 may identify a target object on the further basis of a detected amount of change.

According to an embodiment of the present disclosure, the AI analyzer 330 may train an AI analysis model with data according to a result of identifying a target object or a monitoring result from the IoT monitoring server 400. For example, the AI analyzer 330 may learn collected IOT data with deep learning technology (e.g., long short-term memory (LSTM)), and may build a learning model for determining emergency/dangerous situations by environment or managing PLC data.

According to an embodiment of the present disclosure, the AI analyzer 330 may use deep learning technology to process IoT data into time series data. For example, the AI analyzer 330 may configure IoT data as a recurrent neural network (RNN) that is a network having a loop therein, and the loop may enable information to be transmitted from one step to the next step of the network.

According to an embodiment of the present disclosure, the AI analyzer 330 may use LSTM to learn long-term dependency of IT data. For example, the AI analyzer 330 may expand IoT data to have a recurrent neural network. As the recurrent neural network includes neural network modules repeated in the form of a chain, one repeated module may include a plurality of interacting layers.

According to an embodiment of the present disclosure, the logistics/distribution management unit 340 may use object information identified on the basis of IT sensor data to perform logistics/distribution management related to an object. For example, logistics/distribution management may perform a process of determining information on logistics/distribution processes conducted according to a type of a particular object, the amount of logistics/distribution and the expected amount of logistics/distribution of the object, the amount of logistics/distribution that is input and output in each logistics/distribution process, etc.

Figure 3:
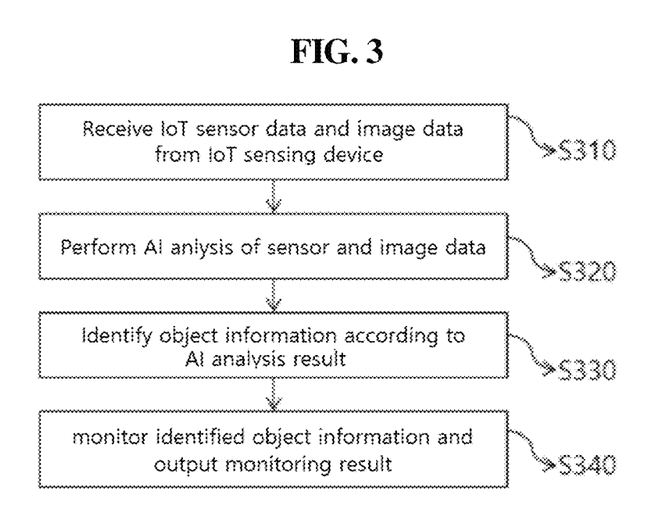
FIG. 3 is a flowchart illustrating the operation of an object identification and monitoring system according to an embodiment of the present disclosure.

FIG. 3 is a flowchart illustrating the operation of an object identification and monitoring system according to an embodiment of the present disclosure.

Referring to FIG. 3, an IoT control server 300 may receive IOT sensor data and IR image data from an IoT sensing device 100 in step S310 p.

In step S320, the IoT control server 300 may use the received IoT sensor data and IR image data to perform an AI analysis.

In step S330, the IoT control server 300 may identify object information according to a result of the AI analysis.

In step S340, the IoT control server 300 may control an IoT monitoring server 400 such that the identified object information is monitored and an electronic device of a user outputs a result of monitoring.

Figure 4:
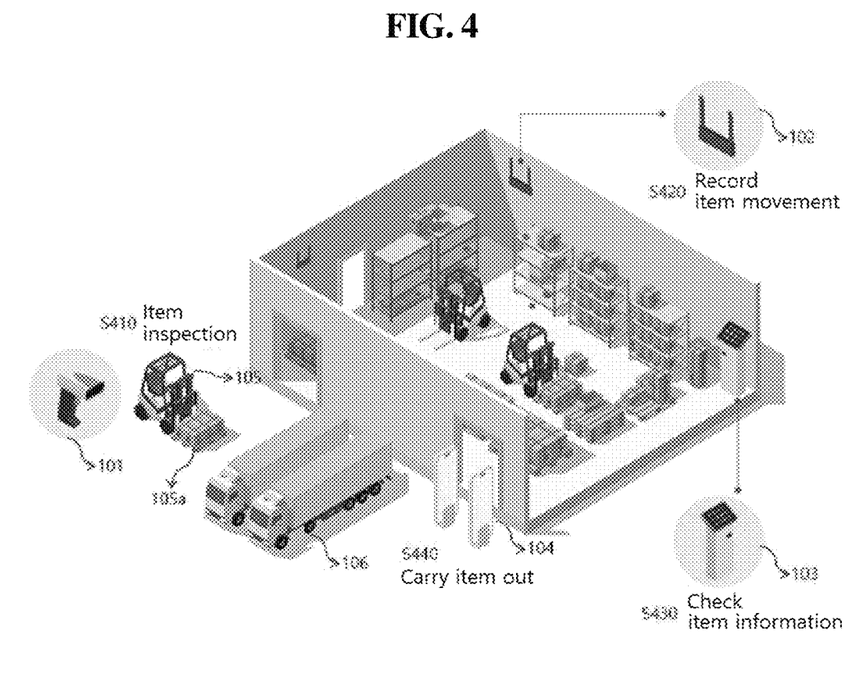
FIG. 4 is a diagram illustrating an operation of performing item management by a system according to an embodiment of the present disclosure.

FIG. 4 is a diagram illustrating an operation of performing item management by a system according to an embodiment of the present disclosure.

According to an embodiment of the present disclosure, an IoT control server 300 may use an IoT sensing device (e.g., a tag scanner 101, an AP 102, a tablet PC 103, and an RFID gate 104) to inspect items carried into a management warehouse, record movement of the items carried into and out of the warehouse and locations of materials, and carry the items out of the warehouse.

Referring to FIG. 4, the IoT control server 300 may use a forklift 105 to perform item inspection in step S410. For example, the tag scanner 101 included in the forklift 105 or carried by a user is used to scan a tag attached to an item 105a and acquire IR image data of the item 105a, thereby identifying the item.

According to an embodiment of the present disclosure, in the item inspection step the IoT control server 300 may check tag (e.g., RFID/IoT tag) information on the item 105a to record a current location and arrival time of the item 105a and acquire information, such as a delivery status and transport information (e.g., a departure point, a stopover, and a destination). In addition, the IoT control server 300 may use IR image data to check information related to appearance of items, for example, types of items, the number of items, loading states of items, etc.

In step S420, the IoT control server 300 may record item movement. For example, the IoT control server 300 may use the AP 102 to periodically monitor whether a tag is identified. When a particular tag is identified, the IoT control server 300 may determine that an item corresponding to the tag has been carried in the warehouse. When a particular tag is not identified for a predetermined period of time, the IoT control server 300 may determine that an item corresponding to the tag has been carried out of the warehouse.

According to an embodiment of the present disclosure, the IoT control server 300 may determine a location of a particular item in the warehouse by determining a location at which a tag is identified through the AP 102. Afterward, the IoT control server 300 may transmit a record of item movement and the location of the item to the tablet PC 103 in the warehouse.

In step S430, the IoT control server 300 may perform control such that the tablet PC 103 in the warehouse outputs information recording item movement and locations, whereby the user is capable of checking item information through the tablet PC 103. For example, the user may use the tablet PC 103 to search for a particular item or check an item list of the warehouse. As a particular item is selected, movement information on the item and information on the current location in the warehouse may be output.

In step S440, as an item is scanned through the RFID gate 104, the IoT control server 300 may determine that the item has been carried out. For example, when it is determined that an item has been carried out, the IoT control server 300 may transmit tag information on the item to a vehicle 106 that will deliver the item. The vehicle 106 may determine an item scheduled to be delivered through the received tag information.

Figure 5:
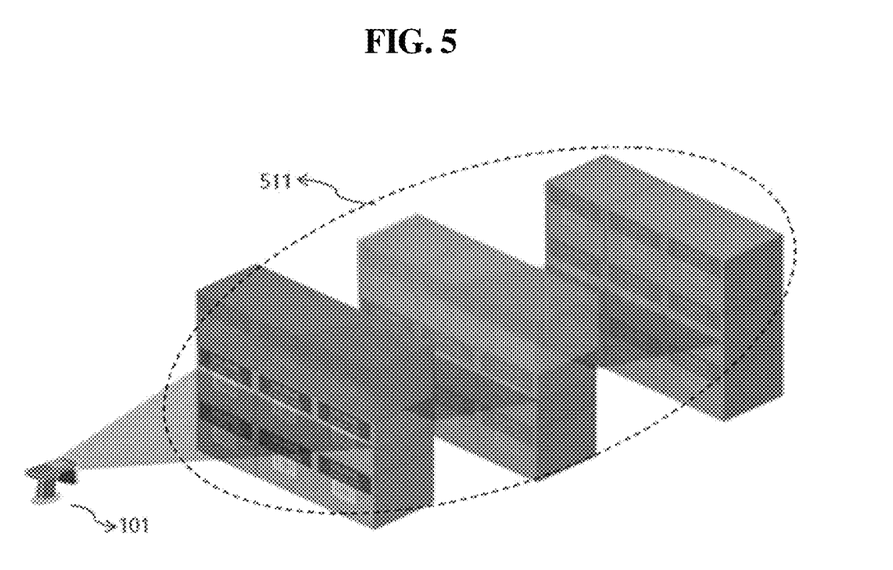
FIG. 5 is a diagram illustrating an example of an operation of identifying an object by a system according to an embodiment of the present disclosure.

FIG. 5 is a diagram illustrating an example of an operation of identifying an object by a system according to an embodiment of the present disclosure.

Referring to FIG. 5, an IoT control server 300 may use a tag scanner 101 to acquire IR image data of an object 511, identify a plurality of RFID tags attached to the object 511, and check the IR image data and the RFID tags as IoT data.

According to an embodiment of the present disclosure, the tag scanner 101 may include an IR sensor. For example, IR laser light emitted from the tag scanner 101 is partially absorbed into the object 511 and is partially reflected and input to the IR sensor, so the tag scanner 101 may acquire IR image data of the object 511.

According to an embodiment of the present disclosure, the IoT control server 300 may use the number of the plurality of RFID tags identified from the object 511, identification locations of the tags, and temperature distribution in the IR image data to determine the number, types, or loading states of items included in the object 511.

According to an embodiment of the present disclosure, the IoT control server 300 may transmit the IR image data to an AI analyzer 330. For example, the AI analyzer 330 may store therein an analysis model for performing an AI analysis according to the type or form of the object, and may apply the IR image data to a particular analysis model to perform an AI analysis of the object.

According to an embodiment of the present disclosure, the IoT control server 300 identifies the object 511 on the basis of the RFID tags as well as the IR image data, thereby identifying various types of information (e.g., the number, type, or loading state) of the object 511.

Figure 6:
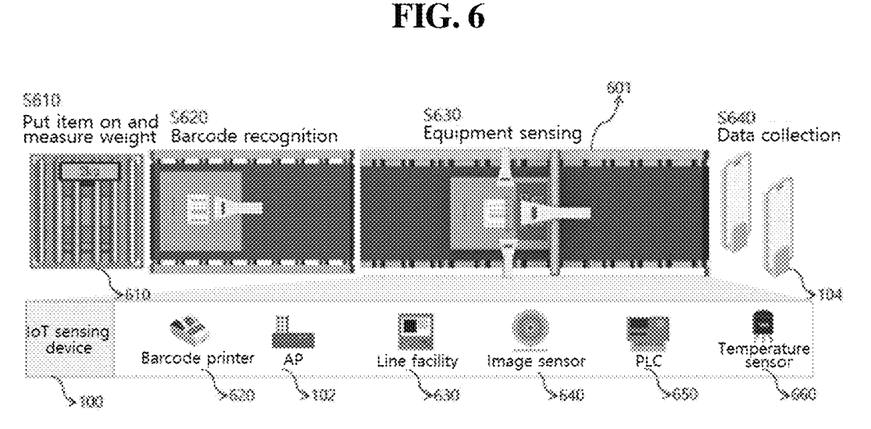
FIG. 6 is a diagram illustrating an example of a conveying operation by a system according to an embodiment of the present disclosure.

FIG. 6 is a diagram illustrating an example of a conveying operation by a system according to an embodiment of the present disclosure.

Referring to FIG. 6, an IoT control server 300 may convey an item by using an IoT sensing device 100 attached to a conveyor belt. For example, the IOT sensing device 100 may include an AP 102, an RFID gate 104, a weight sensor 610, a barcode printer 620, a line facility 630, an image sensor 640, a PLC 650, and a temperature sensor 660.

In step S610, when an item is put on a conveyor belt 601, the IoT control server 300 may use the weight sensor 610 to measure the weight of the item.

In step S620, the IOT control server 300 may recognize a barcode attached to the item. For example, the barcode is output by the barcode printer 620, and when a barcode is output, the barcode printer 620 may transmit information on the barcode to the IoT control server 300. Afterward, when the barcode is sensed, the IOT control server 300 may use stored information to determine information on the barcode.

In step S630, as equipment sensing, the IoT control server 300 may use the IoT sensing device 100 to analyze information on the item put on the conveyor belt 601. For example, the information on the item is information acquired from the IoT sensing device 100 and may include the following: movement information on the item identified by the AP 102; carry-out state information on the item identified by the RFID gate 104; barcode data generated by the barcode printer 620; line facility information acquired from the line facility 630; IR image data acquired from the image sensor 640; PLC-related information acquired from the PLC 650; and temperature information measured by the temperature sensor 660.

According to an embodiment of the present disclosure, the IoT control server 300 may determine, on the basis of analyzed information, information on an item according to RFID information and temperature information. For example, the IoT control server 300 may determine basic information (e.g., the manufacturer and the type) on an item included in RFID information, and may determine appearance information on the item, such as a state in which the item is loaded or the number of items, according to temperature information.

In step S640, the IoT control server 300 may collect data through the RFID gate 104. For example, when an RFID tag is identified through the RFID gate 104, the IoT control server 300 may determine that an item to which the tag is attached has passed the conveyor belt 601.

According to an embodiment of the present disclosure, the IoT control server 300 identifies an item by using an RFID tag, a barcode, sensor data, and IR image data transmitted from the IoT sensing device 100, so that basic information, such as a type or manufacturer of an item, is acquired and appearance information of an item, such as a loading state or the number, may be acquired simultaneously.

Exemplary embodiments of the present disclosure may be implemented by various means, for example, hardware, firmware, software, or a combination thereof. In the case of implementation by hardware, an embodiment of the present disclosure may be implemented by one or more application specific integrated circuits (ASICS), digital signal processors (DSPs), digital signal processing devices (DSPDs), programmable logic devices (PLDs), field programmable gate arrays (FPGAs), processors, controllers, micro controllers, micro processors, etc.

In addition, in the case of implementation by firmware or software, an embodiment of the present disclosure may be implemented by modules, procedures, and/or functions for performing the above-described functions or operations, and may be recorded on a recording medium readable through various computer means. Herein, the recording medium may include program instructions, data files, and/or data structures either alone or in combination. The program instructions to be recorded on the recording medium may be specially designed and configured for the present disclosure or may be well-known to and be usable by those skilled in the art of computer software. Examples of the recording medium include magnetic media such as hard disks, floppy disks, and magnetic tapes; optical media such as compact disk read-only memories (CD-ROM) and digital video disks (DVDs); magneto-optical media such as floptical disks; and hardware devices, such as ROM, RAM, flash memory, etc., which are specially configured to store and execute program instructions. Examples of the program instructions may include not only a mechanical language code formatted by a compiler but also a high level language code that may be implemented by a computer using an interpreter, etc. The hardware devices may be configured to be operated as one or more software modules to conduct the operation according to the present disclosure, and vice versa.

In addition, a device or terminal according to the present disclosure may be run by a command for one or more processors to execute the above-described functions and processes. Examples of the command may include an interpreted command, such as a script command, e.g., a JavaScript or ECMAScript command, or executable code, or other commands stored in a computer readable medium. Furthermore, a device according to the present disclosure may be implemented in a distributed manner over a network like a server farm, or may be implemented in a single computer device.

In addition, a computer program (also known as a program, software, software application, script, or code) installed on a device according to the present disclosure and executing a method according to the present disclosure may be written in any form of a programming language that includes compiled or interpreted languages or declarative or procedural languages, and may be deployed in any form including a stand-alone program or module, a component, a subroutine, or another unit suitable for use in a computing environment. A computer program does not necessarily correspond to a file of a file system. A program may be stored in a single file provided to the requested program, in multiple coordinated files (for example, files that store one or more modules, sub-programs, or portions of code), or in a portion of a file (for example, one or more scripts stored in a markup language document) that holds other programs or data. A computer program may be deployed to be executed on one computer or multiple computers that are located at one site or distributed across multiple sites and interconnected by a communication network.

Although the present disclosure has been described with reference to separate drawings for the convenience of description, a new embodiment may be implemented by combining embodiments illustrated in the respective drawings. In addition, the configurations and methods of the above-described embodiments of the present disclosure may not be applied in a limited manner, and all or part of each of the above-described embodiments may be selectively combined and configured to make a variety of modifications.

Although the exemplary embodiments of the present disclosure have been illustrated and described above, the present disclosure is not limited to the aforesaid particular embodiments, and can be variously modified by those skilled in the art without departing the gist of the present disclosure defined in the claims. The modifications should not be understood individually from the technical idea or perspective of the present disclosure.

What is claimed is:

1. A system for monitoring object identification based on artificial intelligence using Internet Of Things (IOT) sensors, the system comprising:
    an IoT sensing device configured to acquire sensor data and IR image data of a target space or a target object using a plurality of sensors;
    integrated IOT middleware;
    an IoT control server configured to use the integrated IoT middleware to process data acquired by the IOT sensing device, and perform an AI analysis of the processed data; and
    an IoT monitoring server configured to conduct monitoring on the IoT sensing device according to a result of the AI analysis, and perform control such that an external electronic device outputs a result of the monitoring.

2. The system of claim 1, wherein the integrated IoT middleware comprises RFID middleware and IOT device software, and
    the IoT control server is configured to
        use the RFID middleware to process RFID tag information of the acquired sensor data, and use the IoT device software to process IoT sensor data of the acquired sensor data.

3. The system of claim 1, wherein the IoT control server comprises:
an IR image processor configured to analyze the IR image data acquired by the IoT sensing device; and
an IOT data processor configured to analyze RFID tag information and IoT sensor data processed through the integrated IOT middleware.

4. The system of claim 3, wherein the IoT control server further comprises
an AI analyzer configured to
apply the data analyzed by the IR image processor and the IoT data processor to a pre-stored analysis model to derive an object identification index, and
measure and predict the target object on the basis of the derived object identification index.

5. The system of claim 4, wherein the IOT control server further comprises
a logistics/distribution management unit configured to determine a state of logistics or distribution of the target object in the target space according to the result of the AI analysis.

6. The system of claim 5, wherein the logistics/distribution management unit is configured to
check location information on each of the plurality of the sensors and time information at which the sensor data is acquired by a particular sensor among the plurality of the sensors,
determine, on the basis of the checked location information and the checked time information, distribution information indicating a location of the target object in the target space, and
determine, on the basis of a result of measuring and predicting the target object, logistics information indicating a form, a quantity, or a type of the target object.

7. The system of claim 6, wherein the IoT monitoring server is configured to
transmit the determined distribution information and the determined logistics information to the external electronic device connected and communicating with the IoT control server, and perform control such that the external electronic device outputs the distribution information and the logistics information.

8. An artificial intelligence-based object identification and monitoring method using IT sensors, the method comprising:
acquiring sensor data and IR image data of a target space or a target object by using a plurality of the sensors included in an IoT sensing device;
using, by an IoT control server, integrated IOT middleware including RFID middleware and IoT device software to process the data acquired by the IOT sensing device, and performing an AI analysis of the processed data; and
monitoring, by an IoT monitoring server, the IoT sensing device according to a result of the AI analysis, and performing control such that an external electronic device outputs a result of monitoring.

9. The method of claim 8, further comprising
using, by the IoT control server, the RFID middleware to process RFID tag information of the acquired sensor data, and using the IOT device software to process IoT sensor data of the acquired sensor data.

10. The method of claim 8, further comprising
analyzing, by the IOT control server, the IR image data acquired by the IoT sensing device, and analyzing RFID tag information and IoT sensor data processed through the integrated IOT middleware.

11. The method of claim 10, further comprising:
by the IoT control server,
applying the data analyzed by the IR image processor and the IoT data processor to a pre-stored analysis model to derive an object identification index; and
measuring and predicting the target object on the basis of the derived object identification index.

12. The method of claim 11, further comprising
determining, by the IoT control server, a state of logistics or distribution of the target object in the target space according to the result of the AI analysis.

13. The method of claim 12, further comprising:
by the IoT control server,
checking location information on each of the plurality of the sensors and time information at which the sensor data is acquired by a particular sensor among the plurality of the sensors;
determining, on the basis of the checked location information and the checked time information, distribution information indicating a location of the target object in the target space; and
determining, on the basis of a result of measuring and predicting the target object, logistics information indicating a form, a quantity, or a type of the target object.

14. The method of claim 13, further comprising transmitting, by the IoT monitoring server, the determined distribution information and the determined logistics information to the external electronic device connected and communicating with the IOT control server, and performing control such that the external electronic device outputs the distribution information and the logistics information.

* * * * *